United States Patent
Kawamura

(10) Patent No.: US 10,426,007 B2
(45) Date of Patent: Sep. 24, 2019

(54) LIGHTING APPARATUS AND LIGHTING SYSTEM

(71) Applicant: PANASONIC INTELLECTUAL PROPERTY MANAGEMENT CO., LTD., Osaka (JP)

(72) Inventor: Ryo Kawamura, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/896,768

(22) Filed: Feb. 14, 2018

(65) Prior Publication Data

US 2018/0249542 A1  Aug. 30, 2018

(30) Foreign Application Priority Data

Feb. 27, 2017  (JP) ................. 2017-035401

(51) Int. Cl.
| | | |
|---|---|---|
| G08B 21/00 | (2006.01) | |
| H05B 33/08 | (2006.01) | |
| G01G 19/52 | (2006.01) | |
| H05B 37/00 | (2006.01) | |

(52) U.S. Cl.
CPC ......... H05B 33/0845 (2013.01); G01G 19/52 (2013.01); H05B 37/00 (2013.01)

(58) Field of Classification Search
CPC ..... H05B 33/0845; H05B 37/00; G01G 19/52
USPC ...................................................... 340/666
See application file for complete search history.

(56) References Cited

U.S. PATENT DOCUMENTS

| | | | | |
|---|---|---|---|---|
| 5,822,224 | A * | 10/1998 | Nakanishi ............. | G01G 19/12 702/174 |
| 6,397,905 | B1 * | 6/2002 | Mayer ..................... | B65B 3/26 141/188 |
| 2010/0020550 | A1 | 1/2010 | Kawashima et al. | |
| 2010/0060470 | A1 * | 3/2010 | Matsushita ............ | G06Q 10/06 340/653 |
| 2010/0103654 | A1 * | 4/2010 | Yasuda ................... | E04B 9/006 362/147 |
| 2010/0264852 | A1 * | 10/2010 | Julio ................... | H05B 33/0863 315/312 |
| 2011/0002783 | A1 * | 1/2011 | Yamamoto ............ | F04D 25/088 416/30 |
| 2012/0098915 | A1 * | 4/2012 | Oraa ....................... | B41J 29/13 347/108 |
| 2012/0182151 | A1 * | 7/2012 | Tong .................... | H05K 7/1498 340/666 |
| 2015/0035437 | A1 * | 2/2015 | Panopoulos ............ | F21V 14/02 315/112 |
| 2015/0284223 | A1 * | 10/2015 | Hall ........................ | B66D 1/38 254/333 |
| 2017/0374722 | A1 * | 12/2017 | Beiner ............... | H05B 37/0227 |

(Continued)

FOREIGN PATENT DOCUMENTS

| | | |
|---|---|---|
| JP | 2000-285726 A | 10/2000 |
| JP | 2002-110376 A | 4/2002 |
| JP | 2003-007127 A | 1/2003 |

(Continued)

*Primary Examiner* — Naomi J Small
(74) *Attorney, Agent, or Firm* — McDermott Will & Emery LLP

(57) ABSTRACT

A lighting apparatus to which a connection terminal of a device is electrically connected includes a weight measurer that measures the weight of the device that is connected, and outputs the weight of the device.

18 Claims, 5 Drawing Sheets

(56) References Cited

U.S. PATENT DOCUMENTS

2018/0149376 A1* 5/2018 Hale .................... F24F 5/0035

FOREIGN PATENT DOCUMENTS

| JP | 2003-068133 A | 3/2003 |
| JP | 2010-033814 A | 2/2010 |
| JP | 2010-033816 A | 2/2010 |

* cited by examiner

LIGHTING APPARATUS AND LIGHTING SYSTEM

CROSS REFERENCE TO RELATED APPLICATION

This application claims the benefit of priority of Japanese Patent Application Number 2017-035401 filed on Feb. 27, 2017, the entire content of which is hereby incorporated by reference.

BACKGROUND

1. Technical Field

The present disclosure relates to a lighting apparatus and a lighting system using the lighting apparatus.

2. Description of the Related Art

Recent years have seen the emergence of function extending devices (an example of a device) capable of extending the function of a lighting apparatus to include a sensor function such as motion detection, illuminance detection, temperature detection, etc. By connecting such a function extending device to a connection terminal provided in the lighting apparatus, the function of the lighting apparatus can readily be extended without having to disassemble the lighting apparatus.

For example, Japanese Unexamined Patent Application Publication No. 2002-110376 discloses a lighting apparatus including a functional plug (an example of a device) having a structure that is freely-separable and detachable by way of a function extension terminal (an example of a connection terminal).

SUMMARY

When devices are attached to lighting apparatuses mounted on a building part such as a ceiling, the increased weight of the lighting apparatuses places doubt on the load capacity of the building part.

In view of this, the present disclosure provides a lighting apparatus and a lighting system capable of preventing excessive weight caused by the lighting apparatus to which a device has been attached.

A lighting apparatus according to an aspect of the present disclosure is a lighting apparatus to which a connection terminal of a device is to be electrically connected and includes a weight measurer that measures a weight of the device that is connected, and outputs the weight of the device.

Furthermore, a lighting system according to an aspect of the present disclosure includes: a plurality of lighting apparatuses each being the aforementioned lighting apparatus; and a controller that obtains, from a weight measurer of each of the plurality of lighting apparatuses, a weight of a device connected to the lighting apparatus.

The present disclosure is capable of preventing excessive weight caused by a lighting apparatus to which a device has been attached.

BRIEF DESCRIPTION OF DRAWINGS

The figures depict one or more implementations in accordance with the present teaching, by way of examples only, not by way of limitations. In the figures, like reference numerals refer to the same or similar elements.

DETAILED DESCRIPTION OF THE EMBODIMENT

Figure 1:
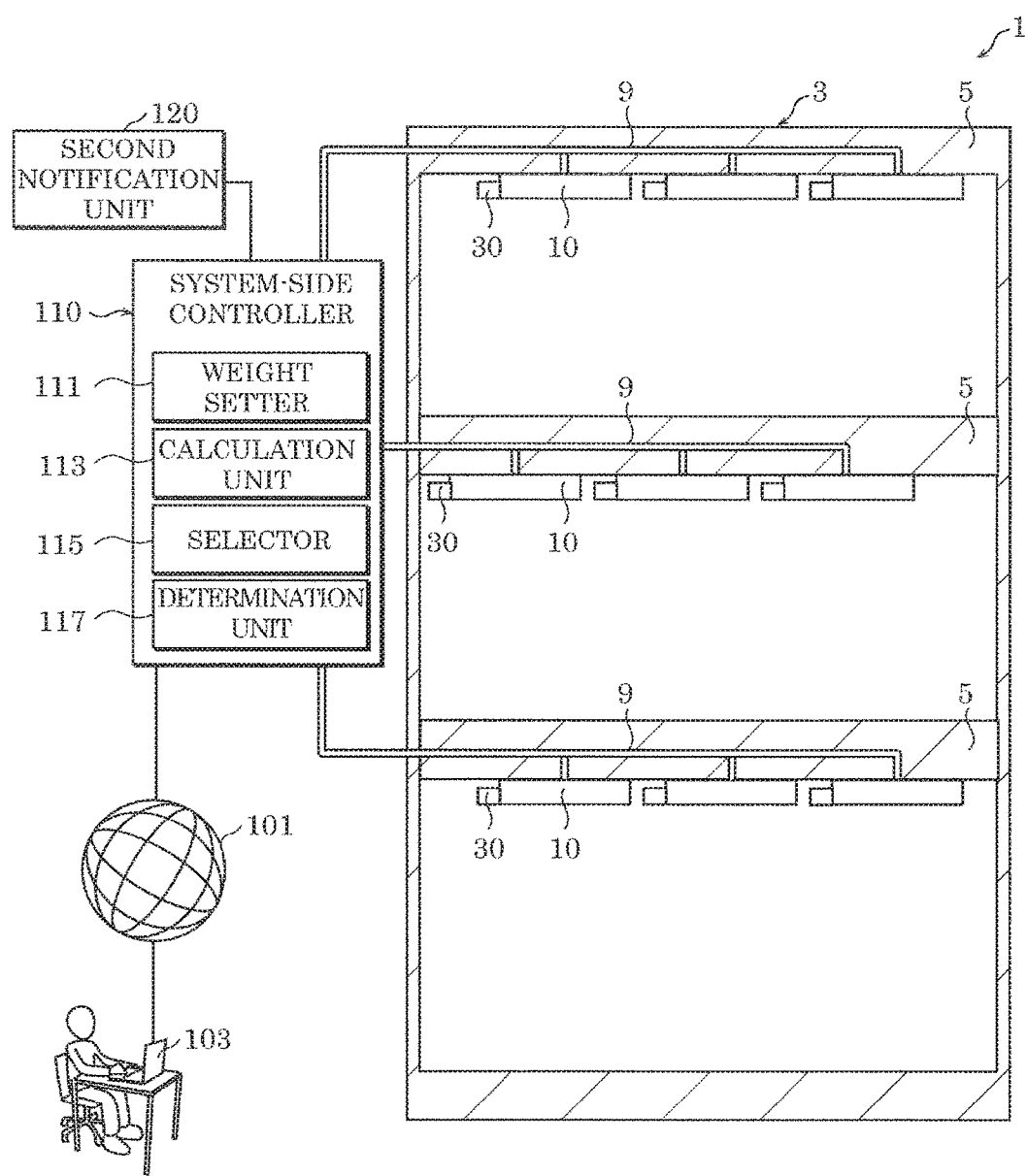
FIG. 1 is a schematic diagram illustrating a lighting system according to an embodiment.

Underlying Knowledge Forming the Basis of the Present Disclosure

Recent years have seen the rapid advancement of Internet of Things (IoT) related technology that utilizes information obtained by connecting devices to a network, and finds new value and services. For example, a motion detector included in a lighting apparatus detects motion of a person and transmits information regarding the motion of the person to a server; and the server determines, from the information regarding the movement of the person, a scene, etc. that is identified by at least one of dimming and toning and transmits information based on the scene to the lighting apparatus so as to provide an appropriate lighting environment based on the scene. In this manner, the lighting apparatus can perform lighting based on the scene.

Furthermore, recent years have seen the emergence of devices capable of function extension which extends the function of a lighting apparatus to include a sensor function such as motion detection, illuminance detection, temperature detection, etc. By connecting such a function extending device to a connection terminal provided in the lighting apparatus, the function of the lighting apparatus can readily be extended without having to disassemble the lighting apparatus.

However, when a device is connected to the connection terminal of the lighting device in extending the function of the lighting apparatus, the weight of the device causes an increase in the weight imposed on the building part, such as a ceiling, to which the lighting device is mounted. In a large establishment, aside from a plurality of lighting apparatuses, other apparatuses such as air conditioners are also attached to the building part, and thus connecting devices to all of the lighting apparatuses would place doubt on the load capacity of the building part. As such, there is a demand for a lighting apparatus capable of preventing excessive weight caused by the lighting apparatus to which a device has been attached.

In view of this, it is possible to prevent excessive weight caused by the lighting apparatus to which the device has been attached.

Hereinafter, exemplary embodiments of the present disclosure will be described with reference to the drawings. The embodiments described below each show a specific example of the present disclosure. The numerical values, shapes, materials, structural components, the placement and connection of the structural components, etc. shown in the following embodiments are mere examples, and are not intended to limit the scope of the present invention. Furthermore, among the structural components in the following embodiments, components not recited in any one of the independent claims which indicate the broadest concepts of the present invention are described as arbitrary structural components.

It should be noted that the drawings are schematic diagrams, and do not necessarily provide strictly accurate illustration. Furthermore, in the drawings, substantially identical components are assigned the same reference signs, and overlapping description is omitted or simplified.

A lighting apparatus and a lighting system according to embodiments of the present disclosure are described below.

Embodiment

[Configuration]

Figure 2:
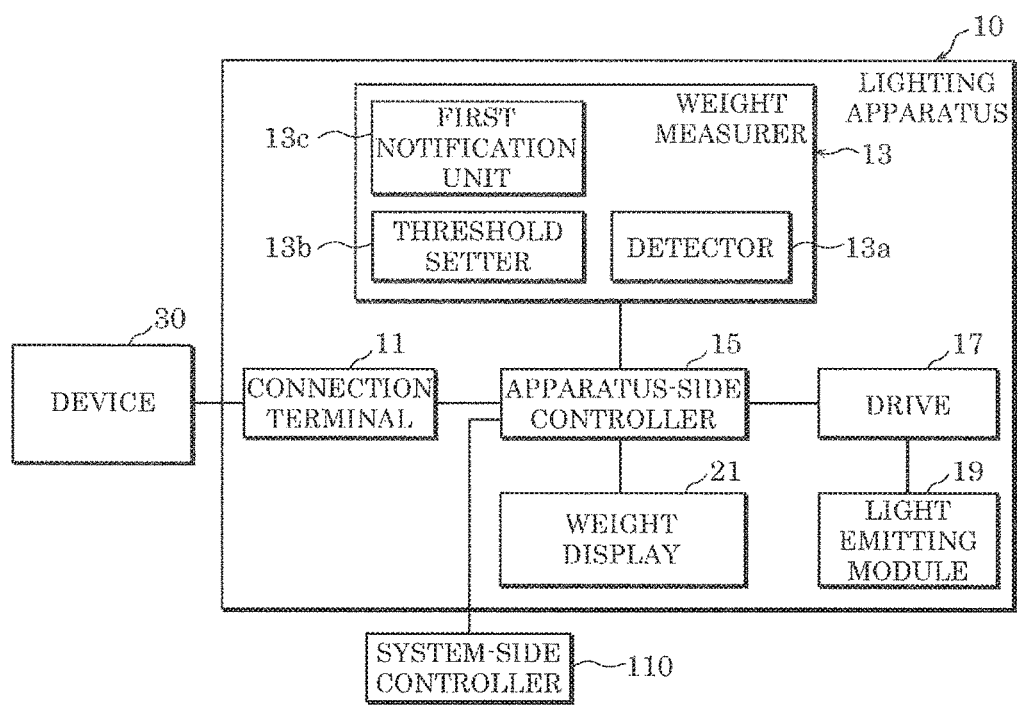
FIG. 2 is a block diagram illustrating a lighting apparatus and a device according to the embodiment.
Figure 3:
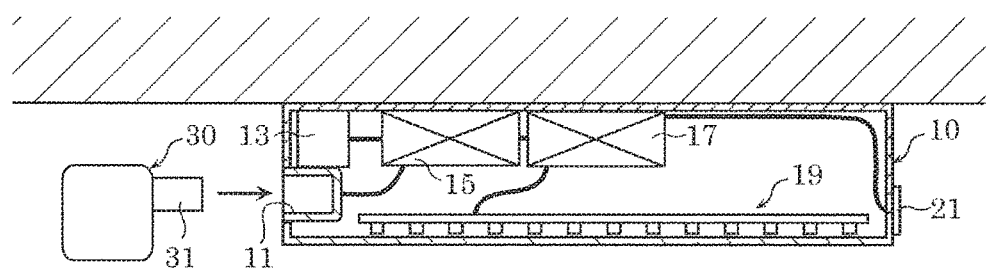
FIG. 3 is a schematic diagram illustrating the lighting apparatus and the device according to the embodiment.

FIG. 1 is a schematic diagram illustrating lighting system 1 according to an embodiment. FIG. 2 is a block diagram illustrating lighting apparatus 10, device 30, etc., according to this embodiment. FIG. 3 is a schematic diagram illustrating lighting apparatus 10 and device 30 according to this embodiment. In FIG. 3, the block diagram of FIG. 2 is schematically represented with part of the configuration omitted.

As illustrated in FIG. 1, lighting system 1 is installed in establishment 3 such as a house, office, etc. Lighting system 1 is connected to external device 103 via network 101.

Lighting system 1 includes a plurality of lighting apparatuses 10, a plurality of devices 30, system-side controller 110 (example of a controller), and second notification unit 120.

Lighting apparatuses 10 are installed inside establishment 3. For example, a plurality of lighting apparatuses 10 are installed in each floor. Lighting apparatuses 10 are installed in building parts 5 such as ceilings or walls, and illuminate the surroundings. In this embodiment, as an example, three lighting apparatuses 10 are installed in each of the floors of establishment 3 which has three floors.

As illustrated in FIG. 2 and FIG. 3, each lighting apparatus 10 includes connection terminal 11, weight measurer 13, apparatus-side controller 15, drive 17, light emitting module 19, and weight display 21.

Connection terminal 11 is for example a female terminal having a plurality of terminals, and is a metal terminal used for electrical connection with device 30. Connection terminal 11 has a shape that conforms to a connection standard such as Universal Serial Bus (USB), for example. Connection terminal 11 is formed in the casing of lighting apparatus 10. Although connection terminal 11 is disposed in an end cap of lighting apparatus 10 in this embodiment, there is no particular limitation as to the where it is disposed.

Weight measurer 13 is device capable of measuring the weight of device 30 that is connected to connection terminal 11 of lighting apparatus 10.

Weight measurer 13 includes detector 13a, threshold setter 13b, and first notification unit 13c.

Detector 13a is a weight sensor that measures the weight of device 30 that is connected to connection terminal 11 of lighting apparatus 10, and outputs the measured weight to apparatus-side controller 15. Detector 13a is for example a load cell type, an electromagnetic type, or a tuning fork type weight sensor.

To give an example of the measuring of the weight of device 30, when detector 13a is of the load cell type, the weight of device 30 may be measured by providing detector 13a in the periphery of connection terminal 11, detecting the amount of strain in connection terminal 11, and performing certain processing based on a load signal that is based on the amount of strain. Specifically, the light emitting module 19 side of connection terminal 11 is secured, and strain gauges are installed in the periphery of connection terminal 11. For example, two strain gauges are installed aligned at an interval in the insertion direction of connection terminal 31 of device 30, on the top side of connection terminal 11. Specifically, one of the strain gauges is disposed on the top side of connection terminal 11, on the light emitting module 19 side, and the other strain gauge is disposed on the top side of connection terminal 11, on the device 30 side, spaced a predetermined interval from the one strain gauge. Furthermore, two strain gauges may also be provided on the bottom side of connection terminal 11. By doing so, when connection terminal 31 of device 30 is inserted into connection terminal 11, the amount of strain in connection terminal 11 is detected, and the weight of device 30 is measured.

Furthermore, as an example of measuring the weight of device 30, the weight of device 30 may be measured by detecting the amount of tilting of connection terminal 11, and performing certain processing based on a load signal that is based on the amount of inclination. Specifically, an optical sensor may be disposed on the topside or bottom side of connection terminal 11, and the weight of device 30 may be converted from the amount of movement (amount of tilt) of connection terminal 11 that occurs when device 30 is connected to connection terminal 11.

Threshold setter 13b is a device capable of setting a threshold for the weight of device 30 connected to connection terminal 11 of lighting apparatus 10. Threshold setter 13b is capable of arbitrarily changing the threshold. The threshold that is set may be stored in a storage device such as a memory.

First notification unit 13c is a device which, when the weight of device 30 connected to connection terminal 11 of lighting apparatus 10 exceeds the threshold set in advance by threshold setter 13b, notifies the surroundings that the weight of device 30 exceeds the threshold. Specifically, when the weight of device 30 detected by detector 13a exceeds the threshold set by threshold setter 13b, first notification unit 13c outputs the weight of device 30 to apparatus-side controller 15. First notification unit 13c performs notification, etc. by sound or by a display of text, light, etc. First notification unit 13c is for example a display device, etc., such as a lamp, a speaker, or a liquid crystal display.

When the weight of device 30 detected by detector 13a is equal to or less than the threshold set by threshold setter 13b, first notification unit 13c transmits the weight of device 30 to apparatus-side controller 15. Apparatus-side controller 15 simply causes the inputted weight of device 30 to be displayed on weight display 21.

Furthermore, when the weight of device 30 with respect to the weight of lighting apparatus 10 exceeds a preset proportion threshold, weight measurer 13 notifies, via first notification unit 13c, that the weight of device 30 exceeds the proportion threshold. For example, weight measurer 13 stores in advance the weight of lighting apparatus 10 in a storage device such as a memory, and, after measuring the weight of device 30, calculates the proportion of the weight of device 30 with respect to the weight of lighting apparatus 10. This proportion calculation may be performed by a calculating unit included in weight measurer 13 or may be performed by apparatus-side controller 15. The calculating unit of weight measurer 13 in such a case can be implemented by an electronic circuit on which a central processing unit (CPU), a memory, etc., are mounted.

Apparatus-side controller 15 is a control device that performs various controls for lighting apparatus 10, and instructs, for example, turning on the light, turning off the light, the dimming level, and the toning level to drive 17.

When instructing the dimming level and the toning level to drive 17, apparatus-side controller 15 outputs a dimming signal indicating the dimming level and a toning signal indicating the toning level to drive 17. In other words, when lighting apparatus 10 receives a command from a control terminal, apparatus-side controller 15 instructs drive 17 in accordance with the command. In this manner, apparatus-side controller 15 causes light emitting module 19 to operate in accordance with the instruction from the control terminal.

Apparatus-side controller 15 can be implemented by an electronic circuit on which a central processing unit (CPU), a memory, etc., are mounted.

Drive 17 is a device that supplies light emitting module 19 with light emission voltage according to the dimming level indicated by the dimming signal and the toning level indicated by the toning signal from apparatus-side controller 15. Specifically, drive 17 is a pulse width modulation (PWM) control circuit. Drive 17 determines the dimming level and toning level of light emitting module 19 according to the dimming signal and the toning signal from apparatus-side controller 15.

Light emitting module 19 includes a solid-state light emitting element that emits light according to current supplied from drive 17, and a substrate on which the solid-state light emitting element is mounted. The solid-state light emitting element may be a light emitting diode (LED) or an organic electro-luminescent (EL) light emitting element.

Weight display 21 is a monitor that displays the weight, etc. of device 30 measured by weight measurer 13 and transmitted via apparatus-side controller 15. It should be noted that weight display 21 may be a simple panel that displays only the weight, or the like, of device 30, or may be a control panel or remote control for controlling the operations of light emitting module 19, such as turning on the light, turning off the light, dimming, toning, via apparatus-side controller 15 and drive 17.

Device 30 is a device that requires a power supply and is capable of communication, such as a camera, a motion sensor, a receiver of a beacon, etc., or a fire alarm, for example. In this embodiment, device 30 includes a male connection terminal 31 that conforms to a connection standard such as USB, and power is supplied thereto by electrically connecting control terminal 31 of device 30 to connection terminal 11 of lighting apparatus 10.

System-side controller 110 is connected to a plurality of lighting apparatuses 10 via signal line 9, and obtains the weight of devices 30 from weight measurers 13 of lighting apparatuses 10. System-side controller 110 transmits a value calculated by calculating unit 113 to external device 103 via network 101. Furthermore, system-side controller 110 may transmit the value calculated by calculating unit 113 to second notification unit 120.

It should be noted that the weight of each device 30 obtained by system-side controller 110 may be a direct numerical value or an indirect numerical value. Specifically, the weight of device 30 obtained by system-side controller 110 may be the weight measured by weight measurer 13 from connection terminal 11, or may be an indirect weight which is the weight of device 30 that can be obtained by weight measurer 13 from the indirect numerical value, such as the amount of strain or the amount of tilt of connection terminal 11, that is received by weight measurer 13.

System-side controller 110 includes selector 115, weight setter 111, calculating unit 113, and determination unit 117.

Selector 115 is a device capable of arbitrarily selecting one or more lighting apparatuses 10 from the plurality of lighting apparatuses 10. Selector 115 forms the selected one or more lighting apparatuses 10 into one group. Selector 115 may form groups on a per room or per floor basis, for example. Selector 115 stores information regarding the groups that are formed in a storage device such as a memory.

Weight setter 111 sets an apparatus weight upper limit for lighting apparatuses 10 of one group that can be installed in building part 5. For example, in order not to exceed the recommended load capacity of building part 5 for each room, floor, etc., weight setter 111 sets such load capacity as the weight upper limit. Since the weight upper limit changes according to, for example, a change in rooms, floors, etc., the installation of other apparatuses such as air conditioners, etc., weight setter 111 may be capable of setting the weight upper limit for one group for each area such as a room, a floor, etc. Here, apparatus refers to, for example, lighting apparatus 10, an air conditioner, a fire alarm, etc. When another apparatus such as an air conditioner is installed in building part 5, a weight upper limit which takes the other apparatus into account can be inputted via weight setter 111.

Calculation unit 113 calculates a total weight which is the sum total of the weights of all lighting apparatuses 10 selected by selector 115 and the weight of all devices 30 connected to all lighting apparatuses 10 selected. Specifically, calculation unit 113 calculates the total weight for each group, and transmits the calculated total weight for each group to second notification unit 120. Furthermore, calculation unit 113 transmits the total weight calculated for each group to external device 103 via network 101. It should be noted that, if there is a change in the weight of the group received from lighting apparatuses 10 of the group, calculation unit 113 may transmit the total weight in turn to second notification unit 120 and external device 103.

Furthermore, calculation unit 113 calculates the difference between the weight of the group and the weight upper limit. Specifically, the difference is the value obtained by subtracting the weight of the group from the weight upper limit. This difference is calculated by calculation unit 113 for each group. Calculation unit 113 transmits the calculated difference to second notification unit 120 and external device 103.

Determination unit 117 determines whether the weight of the group exceeds the weight upper limit set by weight setter 111. When determination unit 117 determines that the weight of the group exceeds the weight upper limit, system-side controller 110 transmits information indicating "excessive weight" to second notification unit 120 and external device 103. Here, information indicating excessive weight includes the weight of the group and the weight upper limit.

On the other hand, when determination unit 117 determines that the weight of the group does not exceed the weight upper limit, system-side controller 110 transmits information indicating "below weight upper limit" to second notification unit 120 and external device 103. The information indicating below weight upper limit is information indicating, for example, the current weight of the group, the difference between the weight of the group and the weight upper limit (i.e., the weight of an apparatus that can be additionally installed), etc.

System-side controller 110 can be implemented by an electronic circuit on which a central processing unit (CPU), a memory, etc., are mounted.

External device 103 is, for example, a computer terminal, a server, etc. External device 103 can arbitrarily change the preset threshold for the weight of device 30, via network 101. Furthermore, external device 103 receives the total weight and the difference calculated by calculation unit 113 via network 101, and the total weight and the difference are displayed on the display of external device 103.

Second notification unit 120 notifies the weight of the group, the difference between the weight of the group and the weight upper limit, information indicating excessive weight, information indicating below weight upper limit, etc., received from system-side controller 110 to the surroundings, using notification by sound or display, etc.

[Lighting Apparatus Operation]

Figure 4:
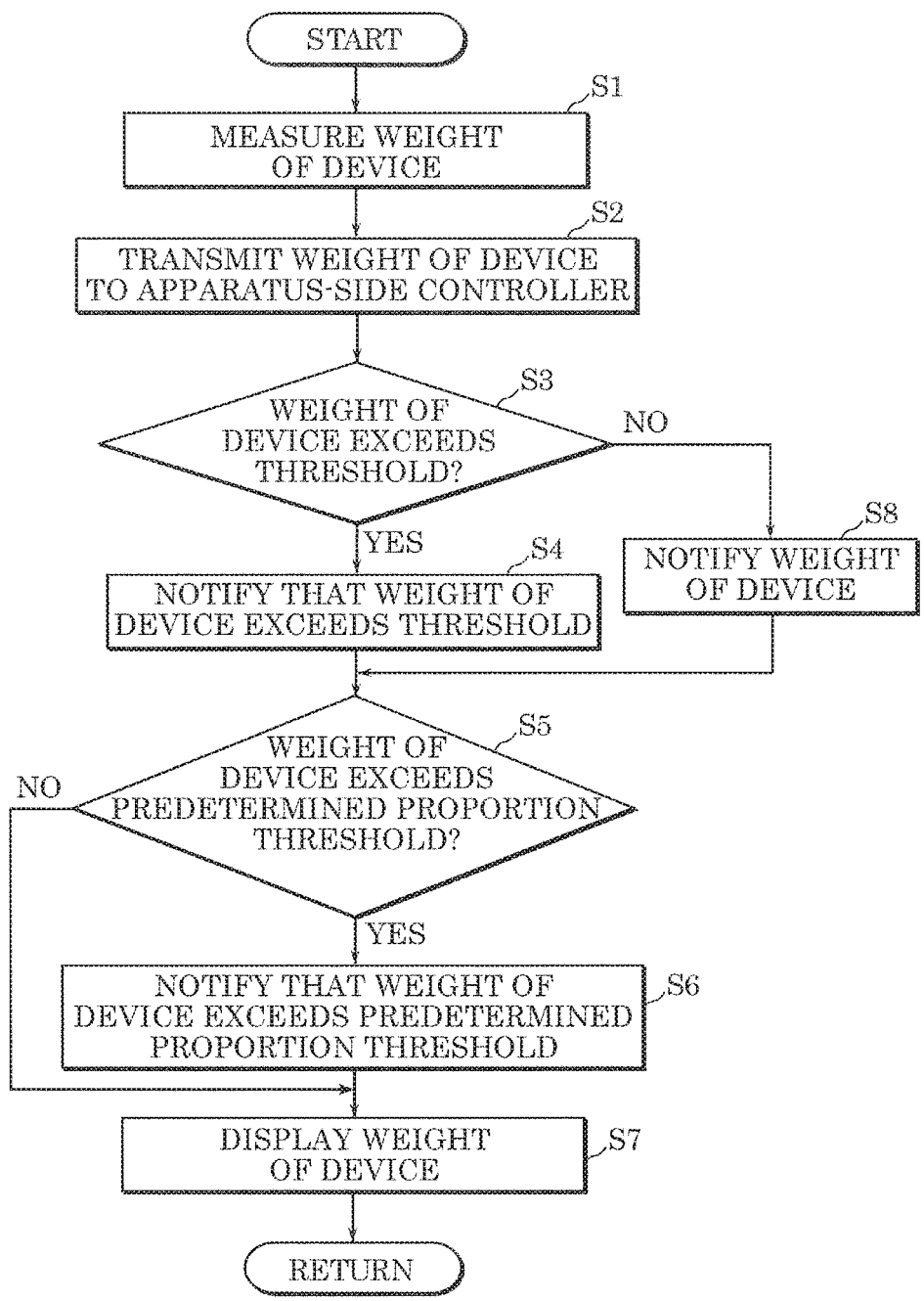
FIG. 4 is a flowchart illustrating operation of the lighting apparatus according to the embodiment.

Next, the operation of lighting apparatus 10 according to this embodiment will be described. FIG. 4 is a flowchart illustrating the operation of lighting apparatus 10 according to this embodiment.

In this process flow, it is assumed that the threshold for the weight of device 30 is set in advance by threshold setter 13b.

As illustrated in FIG. 4, first, a user connects connection terminal 31 of device 30 to connection terminal 11 of lighting apparatus 10 in order to electrically connect lighting apparatus 10 and device 30. Weight measurer 13 of lighting apparatus 10 measures the weight of device 30 connected to connection terminal 11 of lighting apparatus 10 (S1). Specifically, detector 13a of weight measurer 13 detects and calculates the weight of device 30 connected to connection terminal 11 of lighting apparatus 10.

Next, weight measurer 13 transmits the weight of device 30 (S2). The destination for the transmission of the weight of device 30 is system-side controller 110 which controls lighting apparatuses 10. It should be noted that, together with the weight of device 30, weight measurer 13 may transmit the weight of lighting apparatus 10 stored in a storage device such as a memory, to system-side controller 110 via apparatus-side controller 15.

Next, when the weight detected by detector 13a exceeds the threshold (YES in S3), first notification unit 13c notifies that the weight of device 30 exceeds the threshold (S4).

Next, when weight measurer 13 measures that the weight of device 30 with respect to the weight of lighting apparatus 10 exceeds a preset proportion threshold (a predetermined proportion threshold) (YES in S5), first notification unit 13c notifies that the weight of device 30 exceeds the predetermined proportion threshold (S6). In other words, it is considered that, when the measured weight of device 30 with respect to the weight of lighting apparatus 10 exceeds the predetermined proportion threshold, the weight balance between device 30 and lighting apparatus 10 is bad.

On the other hand, when weight measurer 13 measures that the weight of device 30 with respect to the weight of lighting apparatus 10 is less than or equal to the preset proportion threshold (predetermined proportion threshold) (NO in S5), the process flow advances to step S7.

Next, weight display 21 displays the weight of device 30 measured by weight measurer 13 (S7). Subsequently, the process flow returns to step S1.

On the other hand, when the weight detected by detector 13a does not exceed the threshold (NO in S3), first notification unit 13c notifies the weight of device 30 (S8). Then the process flow advances to step S5 and the same process flow is performed.

[Lighting System Operation]

Figure 5:
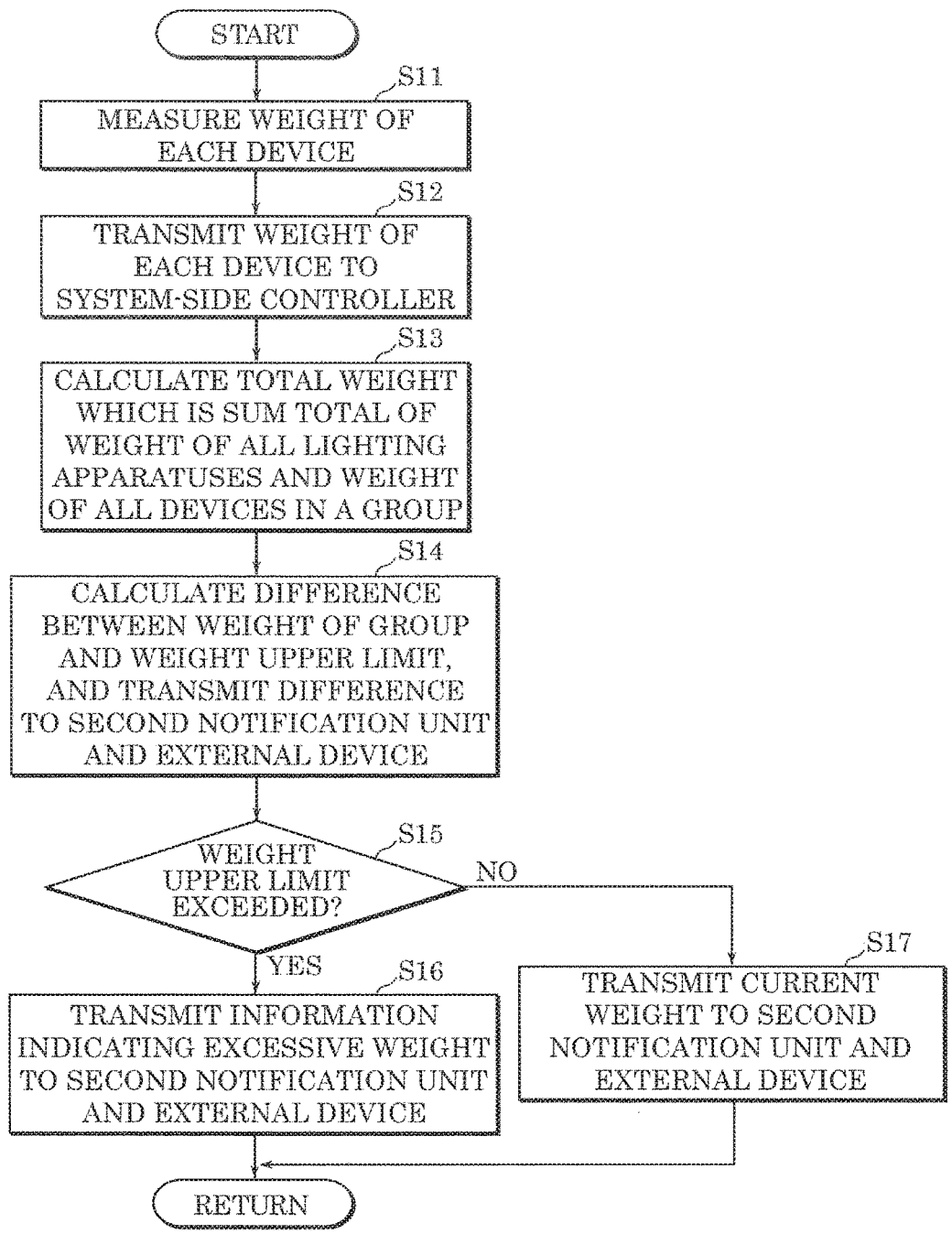
FIG. 5 is a flowchart illustrating operation of the lighting system according to the embodiment.

Next, the operation of lighting system 1 according to this embodiment will be described. FIG. 5 is a flowchart illustrating the operation of lighting system 1 according to this embodiment.

In this operation of lighting system 1, an example in which lighting system 1 includes a plurality of lighting apparatuses 10 in establishment 3 such as that in FIG. 1. In this process flow, it is assumed that the weight upper limit is set by system-side controller 110 for each group. In this process flow, the operation for a single group is described.

As illustrated in FIG. 5, each weight measurer 13 in the group measures the weight of device 30 connected to connection terminal 11 of its lighting apparatus 10 (S11). Specifically, detector 13a of weight measurer 13 detects and calculates the weight of device 30 connected to connection terminal 11 of lighting apparatus 10.

Next, each weight measurer 13 transmits the weight of device 30 to system-side controller 110 (S12). It should be noted that, together with the weight of device 30, weight measurer 13 may transmit the weight of lighting apparatus 10 stored in a storage device such as a memory, to system-side controller 110.

Next, calculation unit 113 calculates a total weight which is the sum total of the weights of all lighting apparatuses 10 in a group and the weight of all devices 30 connected to connection terminals 11 of lighting apparatuses 10 in the group (S13).

Next, calculation unit 113 calculates the difference between the weight of the group and the weight upper limit, and transmits information regarding the difference to second notification unit 120 and external device 103 (S14). Second notification unit 120 and external device 103 output this difference.

Next, determination unit 117 determines whether the weight of the group exceeds the weight upper limit set by weight setter 111 (S15).

When determination unit 117 determines that the weight of the group exceeds the weight upper limit set by weight setter 111 (YES in S15), system-side controller 110 transmits information indicating excessive weight to second notification unit 120 and external device 103 (S16). Second notification unit 120 and external device 103 output the information indicating excessive weight. Subsequently, the process flow returns to step S11.

On the other hand, when determination unit 117 determines that the weight of the group is less than or equal to the weight upper limit set by weight setter 111 (NO in S15), system-side controller 110 transmits the current weight to second notification unit 120 and external device 103 (S17). Second notification unit 120 and external device 103 output (notify, display, etc.) the current weight. Subsequently, the process flow returns to step S11.

In such lighting apparatus 10, weight measurer 13 measures the weight of device 30, and, when the measured weight of device 30 exceeds the threshold, notifies first notification unit 13c that the weight of device 30 exceeds the threshold. Furthermore, when the weight of device 30 with respect to the weight of lighting apparatus 10 exceeds the predetermined proportion threshold, first notification unit 13c notifies that the weight of device 30 exceeds the threshold. As such, the user can recognize the excessive weight caused by lighting apparatus 10 to which device 30 has been attached and the bad balance caused by the connection of device 30.

Furthermore, in such lighting system 1, each lighting apparatus 10 transmits the weight of its device 30 to system-side controller 110, and thus calculation unit 113 of system-side controller 110 calculates the weight of each group. Furthermore, calculation unit 113 of system-side controller 110 calculates the difference between the weight of the group and the weight upper limit. Then, system-side controller 110 outputs the weight of the group and the difference to second notification unit 120 and external device 103. In addition, system-side controller 110 outputs information indicating excessive weight or information indicating below weight upper limit to second notification unit 120 and external device 103. As such, since second notification unit 120 and external device 103 notifies, displays, etc., the weight of the group, the difference, and information indicating excessive weight or information indicating below weight upper limit, the user can recognize, for each group, whether there is excessive weight.

[Effect]

Next, the effect of lighting apparatus 10 and lighting system 1 according to this embodiment will be described.

As described above, lighting apparatus 10 according to this embodiment is a lighting apparatus to which connection terminal 31 of device 30 is to be electrically connected. Lighting apparatus 10 includes weight measurer 13 that measures the weight of device 30 that is connected, and outputs the weight of device 30.

In this manner, since weight measurer 13 measures the weight of device 30 connected to connection terminal 11 of lighting apparatus 10 and outputs this weight to the outside, it is possible to recognize the weight of device 30 via the apparatus that receives this weight.

Therefore, it is possible to prevent excessive weight caused by lighting apparatus 10 to which device 30 has been attached.

Furthermore, lighting system 1 according to this embodiment includes a plurality of lighting apparatuses 10 and system-side controller 110 that obtains the weight of respective devices 30 connected to the plurality of lighting apparatuses 10 from weight measurer 13.

Lighting system 1 which uses a plurality of lighting apparatuses 10 also produces the same effect.

Furthermore, in lighting apparatus 10 according to this embodiment, weight measurer 13 includes first notification unit 13c that notifies the surroundings. In addition, when the weight of device 30 that is connected exceeds a preset threshold, first notification unit 13c notifies the fact that the weight of device 30 has exceeded the threshold.

In this manner, since first notification unit 13c of weight measurer 13 notifies that the weight of device 30 exceeds the threshold, the user can recognize, via first notification unit 13c, the excessive weight of lighting apparatus 10 to which device 30 is attached.

Furthermore, in lighting apparatus 10 according to this embodiment, when the weight of device 30 with respect to the weight of lighting apparatus 10 exceeds a preset proportion threshold, first notification unit 13c notifies that the weight of device 30 exceeds the proportion threshold.

In this manner, first notification unit 13c notifies that the weight of device 30 exceeds the preset proportion threshold. If the proportion threshold is not exceeded, it is considered that the balance between device 30 and lighting apparatus 10 is appropriate, and thus device 30 does not easily fall off from lighting apparatus 10, and, by extension, lighting apparatus 10 does not easily fall due to being secured to building part 5 in an unstable state. As such, the user can recognize that device 30 is connected to lighting apparatus 10 in an unstable state.

Furthermore, in lighting apparatus 10 according to this embodiment, weight measurer 13 further includes threshold setter 13b that sets a threshold for the weight of device 30 connected to lighting apparatus 10. Threshold setter 13b arbitrarily changes the threshold.

In this manner, if the threshold can be arbitrarily changed by threshold setter 13b, the user can take into account the weight of another apparatus such as an air conditioner, and thus the threshold can be set flexibly according to the usage mode.

Furthermore, lighting apparatus 10 according to this embodiment further includes weight display 21 that displays the weight of device 30 measured by weight measurer 13.

According to this configuration, since weight display 21 displays the weight of device 30, the user can reliably recognize the weight of device 30.

Furthermore, in lighting system 1 according to this embodiment, system-side controller 110 includes selector 115 that arbitrarily selects one or more lighting apparatuses 10 from the plurality of lighting apparatuses 10, and calculation unit 113 that calculates a total weight which is the sum total of the weights of all lighting apparatuses 10 selected by selector 115 and the weight of all devices 30 connected to all lighting apparatuses 10 selected.

In this manner, since the user can arbitrarily select lighting apparatuses 10 to form a group, it is possible to calculate the total weight which is the weight of all selected lighting apparatuses 10 and all devices 30 (lighting apparatuses 10 in the group). In lighting system 1, the total weight can be calculated on a group basis, and thus it is possible to recognize, for each group, whether there is excessive weight.

Furthermore, in lighting system 1 according to this embodiment, system-side controller 110 further includes weight setter 111 that inputs a weight upper limit for apparatuses that can be installed on building part 5. In addition, calculation unit 113 calculates the difference between the total weight and the weight upper limit.

In this manner, by having weight setter 111 input the weight upper limit of building part 5, calculation unit 113 calculates the difference between the total weight and the weight upper limit. As such, the user can recognize the number of devices 30 that can be safely connected to lighting apparatuses 10, based on the calculated difference.

Furthermore, lighting system 1 according to this embodiment further includes second notification unit 120 that notifies the surroundings. In addition, when the total weight calculated by calculation unit 113 exceeds the weight upper limit set by weight setter 111, system-side controller 110 notifies, via second notification unit 120, that the weight upper limit is exceeded.

In this manner, when the total weight exceeds the weight upper limit, system-side controller 110 notifies, via second notification unit 120, that the total weight of the group exceeds the weight upper limit, and thus the user can more easily recognize whether there is excessive weight.

Furthermore, lighting system 1 according to this embodiment further includes weight display 21 that indicates the total weight and the difference calculated by calculation unit 113.

In this manner, since weight display 21 displays the total weight and the difference, it becomes easy for the user to determine whether there is excessive weight, and recognize the number of devices 30 that can be safely connected to lighting apparatuses 10.

Furthermore, in lighting system 1 according to this embodiment, lighting system 1 is to be connected to external device 103 via network 101. Furthermore, external device 103 arbitrarily changes, via network 101, the threshold for the weight of device 30 that is set in advance, and receives, via network 101, the total weight and the difference calculated by calculation unit 113. In addition, external device 103 displays the total weight and the difference.

In this manner, since the threshold for lighting system 1 can be arbitrarily changed using external device 103 via network 101, the user can more easily set the threshold for lighting apparatuses 10. Furthermore, since external device 103 receives the total weight and the difference via network 101, and the total weight and the difference are displayed on the display of external device 103, the user can easily recognize the number of devices 30 that can be safely connected to lighting apparatuses 10.

(Other Embodiments)

Although an exemplary embodiment has been described thus far, the present disclosure is not limited to the foregoing embodiment.

Figure 6:
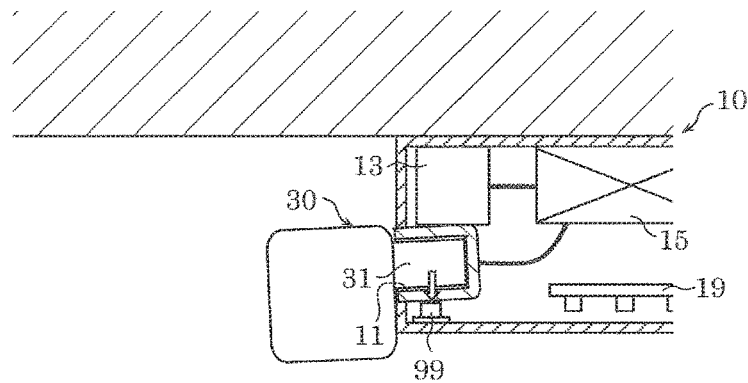
FIG. 6 is a schematic diagram illustrating a lighting apparatus and a device according to a variation.

FIG. 6 is a schematic diagram illustrating a lighting apparatus and a device according to a variation. For example, in the foregoing embodiment, as illustrated in FIG. 6, press-type switch 99 may be disposed under connection terminal 11. When connection terminal 31 of device 30 is connected to connection terminal 11, connection terminal 11 tilts due to the weight of device 30. At this time, connection terminal 11 presses switch 99. By pressing switch 99, switch 99 may transmit a signal to the first notification unit, and the first notification unit may notify the surroundings that the weight of device 30 exceeds the threshold. It should be noted that switch 99 may transmit a signal to the weight display via the apparatus-side controller. Then, the weight display may display that the weight of device 30 exceeds the threshold. It should be noted that switch 99 may transmit information indicating excessive weight to the first notification unit, and the first notification unit may notify that the weight of device 30 exceeds the threshold, by way of sound, light, etc.

Figure 7:
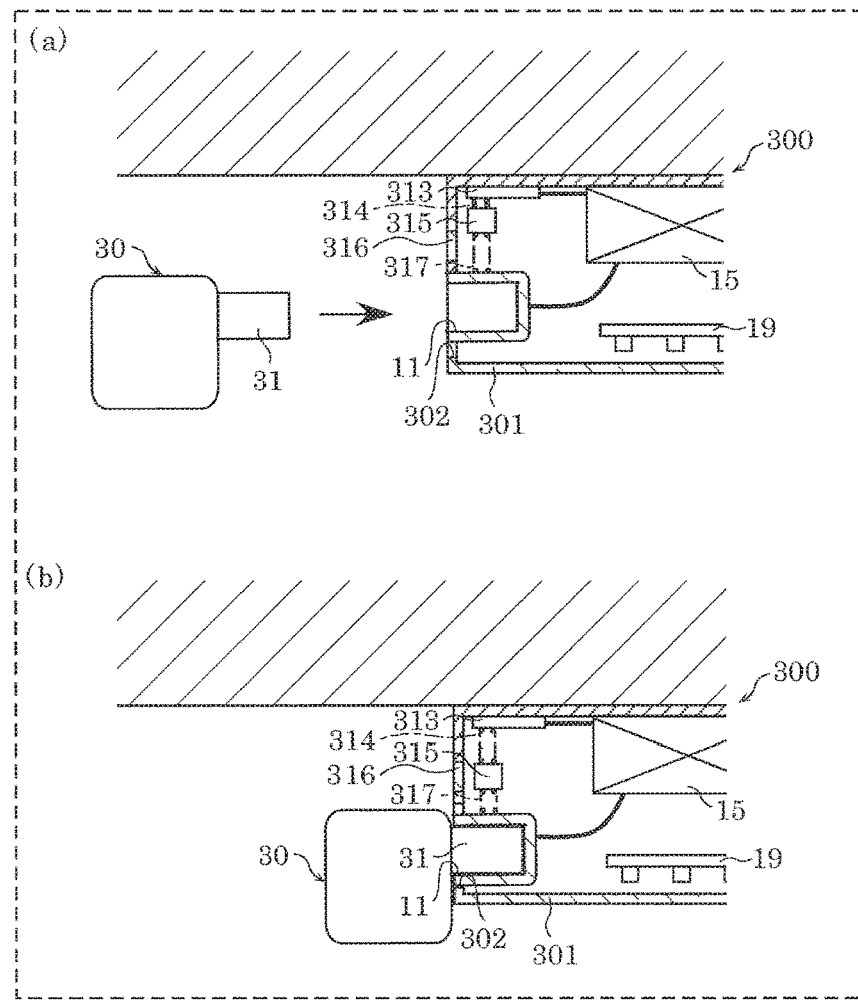
FIG. 7 is a schematic diagram illustrating the lighting apparatus and the device according to the variation, in a state before the device is inserted into the lighting apparatus and a state after the device is inserted into the lighting apparatus.

In FIG. 7, (a) is a schematic diagram illustrating lighting apparatus 300 and device 30 according to the variation in the state before device 30 is inserted into lighting apparatus 300. In FIG. 7, (b) is a schematic diagram illustrating lighting apparatus 300 and device 30 according to the variation in the state after device 30 is inserted into lighting apparatus 300. FIG. 7 is used to describe an example for implementing the first notification unit.

In the foregoing embodiment, spring 314, movable part 315, and spring 317 are linked at the top side of connection terminal 11 so as to be aligned from top to bottom, as illustrated in FIG. 7. Connection terminal 11 is disposed in opening 302 of casing 301 of lighting apparatus 300 so as to swing up and down in casing 301.

In the state before device 30 is inserted into lighting apparatus 300, movable part 315 is disposed at a position from which movable part 315 cannot be seen from window 316 of casing 301. In the state in which device 30 is inserted into lighting apparatus 300, when the weight of device 30 exceeds the threshold, springs 314 and 317 undergo elastic deformation due to the weight of device 30 and movable part 315 moves to a position that is opposite window 316 of casing 301, as illustrated in (b) in FIG. 7. In this case, the user can recognize that the weight of device 30 exceeds the threshold. It should be noted that weight measurer 313 may measure the weight of device 30 by detecting the pressure from spring 314 using a pressure sensor for measuring pressure, and performing certain processing based on a signal that is based on the measured pressure. It should be noted that spring 314, movable part 315, spring 317, and window 316 may be provided on the bottom side of connection terminal 11.

Furthermore, in the foregoing embodiment, the first notification unit may be a device different from the weight measurer. In this case, the weight of the device measured by the weight measurer may be notified by the first notification unit via the apparatus-side controller.

Furthermore, although a single device is connected to a single lighting apparatus in the foregoing embodiment, the configuration is not limited to such, and a plurality of devices may be connected to a single lighting apparatus.

Furthermore, in the foregoing embodiment, the weight measurer may further include a communication unit. The communication unit may transmit the weight detected by the detector of the weight measurer to the system-side controller via the apparatus-side controller, or may directly transmit the weight to the system-side controller by radio communication. The communication unit is for example a communication module having an antenna for radio communication. It should be noted that the communication need not be provided to the weight measurer.

Furthermore, in the foregoing embodiment, the communication unit may perform communication using ZigBee (registered trademark), or may perform communication using Bluetooth (registered trademark), a wireless local area network (LAN), etc.

Although one or more aspects of the present invention has been described based on the foregoing embodiment, the present invention is not limited to the foregoing embodiment. Forms obtained by various modifications to the exemplary embodiment that can be conceived by a person of skill in the art as well as forms realized by combining structural components of different exemplary embodiments, which are within the scope of the essence of the present invention may be included in the scope of the one or more aspects of the present invention.

What is claimed is:

1. A lighting apparatus, comprising:
   a connection terminal to which a device is to be electrically connected;
   a light emitting module that emits light for illuminating surroundings; and
   a weight measurer that measures a weight of the device that is applied to the connection terminal of the lighting apparatus, and outputs the weight of the device.

2. The lighting apparatus according to claim 1, wherein the weight measurer includes a first notification unit that notifies surroundings, and
   when the weight of the device exceeds a threshold that is set in advance, the first notification unit notifies that the weight of the device exceeds the threshold.

3. The lighting apparatus according to claim 2, wherein when the weight of the device with respect to a weight of the lighting apparatus exceeds a proportion threshold that is set in advance, the first notification unit notifies that the weight of the device exceeds the proportion threshold.

4. The lighting apparatus according to claim 2, wherein the weight measurer further includes a threshold setter that sets the threshold for the weight of the device, and the threshold setter arbitrarily changes the threshold.

5. The lighting apparatus according to claim 1, further comprising:
   a weight display that displays the weight of the device measured by the weight measurer.

6. A lighting system, comprising:
   a plurality of lighting apparatuses each being the lighting apparatus according to claim 1; and
   a controller that obtains, from a weight measurer of each of the plurality of lighting apparatuses, a weight of a device connected to the lighting apparatus.

7. The lighting system according to claim 6, wherein the controller includes:
   a selector that arbitrarily selects one or more lighting apparatuses from the plurality of lighting apparatuses; and
   a calculation unit that calculates a total weight which is a sum total of weights of all the one or more lighting apparatuses selected by the selector and weights of all devices connected to all the one or more lighting apparatuses selected.

8. The lighting system according to claim 7, wherein the controller further includes a weight setter that inputs a weight upper limit for apparatuses that can be installed on a building part, and
the calculation unit further calculates a difference between the total weight and the weight upper limit.

9. The lighting system according to claim 8, further comprising:
a second notification unit that notifies surroundings, wherein
when the total weight calculated by the calculation unit exceeds the weight upper limit set by the weight setter, the controller notifies, via the second notification unit, that the weight upper limit is exceeded.

10. The lighting system according to claim 8, further comprising:
a weight display that displays the total weight and the difference calculated by the calculation unit.

11. The lighting system according to claim 8, wherein the lighting system is connected to an external device via a network,
the external device arbitrarily changes, via the network, a threshold for the weight of the device that is set in advance, and receives, via the network, the total weight and the difference calculated by the calculation unit, and
the external device displays the total weight and the difference.

12. The lighting apparatus according to claim 1, wherein when a connection terminal of the device is electrically connected to the connection terminal of the lighting apparatus, the device extends a function of the lighting apparatus.

13. The lighting apparatus according to claim 1, wherein when a connection terminal of the device is electrically connected to the connection terminal of the lighting apparatus, the device performs a communication function.

14. The lighting apparatus according to claim 1, wherein the device is connected to the lighting apparatus by inserting a connection terminal of the device in a surface side of the lighting apparatus.

15. The lighting apparatus according to claim 1, wherein the lighting apparatus is installed on one of ceiling and a wall.

16. The lighting apparatus according to claim 1, wherein the weight measurer includes one selected from the group consisting of a load cell type weight sensor, an electromagnetic type weight sensor, and a tuning fork type weight sensor.

17. A lighting apparatus to which a first connection terminal of a device is to be electrically connected, the lighting apparatus comprising:
a light emitting module that emits light for illuminating surroundings;
a second connection terminal configured to receive the first connection terminal; and
a weight measurer that measures the weight of the device applied to the second connection terminal in a state in which the first connection terminal is connected to the second connection terminal, and outputs information indicating the weight of the device.

18. The lighting apparatus according to claim 17, wherein the lighting apparatus is installed on one of ceiling and a wall.

* * * * *